United States Patent [19]

Handwerker

[11] 4,413,029
[45] Nov. 1, 1983

[54] PROTECTIVE COVER FOR PILE OF PARTICULATE MATERIAL

[75] Inventor: Gary R. Handwerker, Glencoe, Ill.

[73] Assignee: Midwest Canvas Corp., Chicago, Ill.

[21] Appl. No.: 356,251

[22] Filed: Mar. 8, 1982

[51] Int. Cl.³ .......................... E04D 1/34; B32B 3/06
[52] U.S. Cl. ............................................ 428/61; 52/3;
428/102; 428/192; 428/212
[58] Field of Search ................... 428/57, 61, 102, 212,
428/192; 52/2-5, 83, 63, 309.1, 23; 150/52 R,
0.5; 135/15 CF

[56] References Cited

U.S. PATENT DOCUMENTS

| | | | |
|---|---|---|---|
| 7,494 | 3/1833 | Wingate | 52/4 |
| 1,600,749 | 9/1926 | Barnes | 47/21 |
| 2,624,886 | 1/1953 | Herman | 428/57 |
| 2,730,150 | 1/1956 | Wunderwald et al. | 150/0.5 |
| 3,949,527 | 4/1976 | Double et al. | 52/4 |
| 4,084,358 | 4/1978 | Winters | 52/4 |
| 4,122,637 | 10/1978 | Runge et al. | 52/4 |

Primary Examiner—Paul J. Thibodeau
Attorney, Agent, or Firm—Merriam, Marshall & Bicknell

[57] ABSTRACT

A cover for protecting a pile or mound of particulate material in outside storage so that the material is not contaminated, eroded, dissolved or dispersed by the weather. The cover is provided by a plurality of elongated panels that are connected together along their side edges by seams so that the panels and seams extend perpendicularly from the perimeter of the base of the pile toward the top or apex thereof. Some of the panels of the cover are of a material that is porous to gas and nonporous to liquids, and other of the panels are of a material that is nonporous to both gas and liquids. The different porosity panels are arranged in alternating relation in the cover. The seams are reinforced by strips of reinforcing material sewn thereto. Supplemental lengths of weight retaining strips are secured to some of the perpendicularly extending seams at points spaced upwardly from the margin of the cover. The free ends of the retaining strips are adapted to engage and retain a plurality of weights distributed over portions of the cover to counteract aerodynamic lift. A skirt extends outwardly from the margin of the cover to receive ballast material, such material preventing the margin from being displaced to positions exposing the pile.

14 Claims, 8 Drawing Figures

PROTECTIVE COVER FOR PILE OF PARTICULATE MATERIAL

This invention relates to covers for protecting quantities of material in outside storage, and more particularly relates to a cover for protecting a pile of particulate material in outside storage, which employs a multi-panel, reinforced seam construction to increase the strength of the cover.

BACKGROUND OF THE INVENTION

Various types of protective covers have been heretofore developed for covering piles or mounds of particulate material, such as salt, sand, grain and the like, from the effects of the weather while the material is in outside storage. An example of a cover for protecting a large quantity of particulate material from the elements when stored outside in an otherwise unprotected condition is disclosed in the Double et al U.S. Pat. No. 3,949,527. While the cover disclosed in the Double et al patent is capable of protecting the pile or mound of material covered thereby, it possessed a number of shortcomings. For example, in order to counteract the effects of aerodynamic lift, a large number of ballast weights, such as automobile tires, had to be distributed over the upper surface of the cover of the Double et al patent and connected to each other by an extensive network of longitudinally, laterally and radially extending lines or cables. These cables creased and abraided the cover, and frequently cut through it. The large number and distribution of ballast weights, and their connecting cable network, also rendered the cover construction disclosed in the Double et al patent difficult to install and maintain.

Examples of covers for protecting piles of dry material in bulk, such as grain, are likewise disclosed in the Winters U.S. Pat. No. 4,084,358 and Wunderwald et al U.S. Pat. No. 2,730,150. While the covers disclosed in these patents were capable of protecting small to medium sized piles of grain, they did not lend themselves to protecting large piles or mounds of particulate material, such as salt and sand in outside storage.

Easily erectable and collapsible covers have also been developed for protecting trees and bushes from frost. An example of such a cover is disclosed in the Barnes U.S. Pat. No. 1,600,749. The front preventive covering disclosed in the Barnes patent, while capable of temporarily protecting a tree from frost and while utilizing flexible material straps secured to converging, vertically extending members around the periphery of the cover, was not well suited to protect large mounds or piles of particulate material over long periods of time.

SUMMARY OF THE INVENTION

Briefly described, in its broader aspects, the present invention contemplates a protective cover for protecting materials or objects in outside storage from the effects of the weather. In its more specific aspects, the present invention contemplates a protective cover for protecting a pile or mound of particulate material, such as salt or sand, while the latter is in outside storage so that the material is not contaminated, eroded or dispersed by wind and rain. The cover thus includes a plurality of elongated panels that are adapted to overlie the pile and are arranged to extend lengthwise between the apex and perimeter of the base of the pile. The panels are connected together along their side edges by seams that extend substantially perpendicularly to the perimeter of the cover and the base of the pile. The seams are reinforced by strips of tape or webbing, which are sewed to the overlapped, adjoining side edges of the panels. Supplemental lengths of tape or webbing are secured to the seams at points spaced upwardly from the margin of the cover to permit weights, such as automobile tires, to be retained on the outer surface of the cover. Only one row of weights is provided on each of the longer sides of the pile to counteract aerodynamic lift. A skirt extends outwardly from the margin of the cover for receiving ballast material such as sand or gravel. Such ballast material prevents the margin of the cover from being displaced by the wind.

According to the present invention, the panels of the cover are formed from materials of different porosity, namely canvas and polyethylene. The polyethylene and canvas panels are arranged in alternating relation in the cover so that the cover is porous to gas and substantially nonporous to liquids. This multi-panel construction also reduces the weight of the cover without any significant loss in strength.

DETAILED DESCRIPTION

Figures 1, 2:
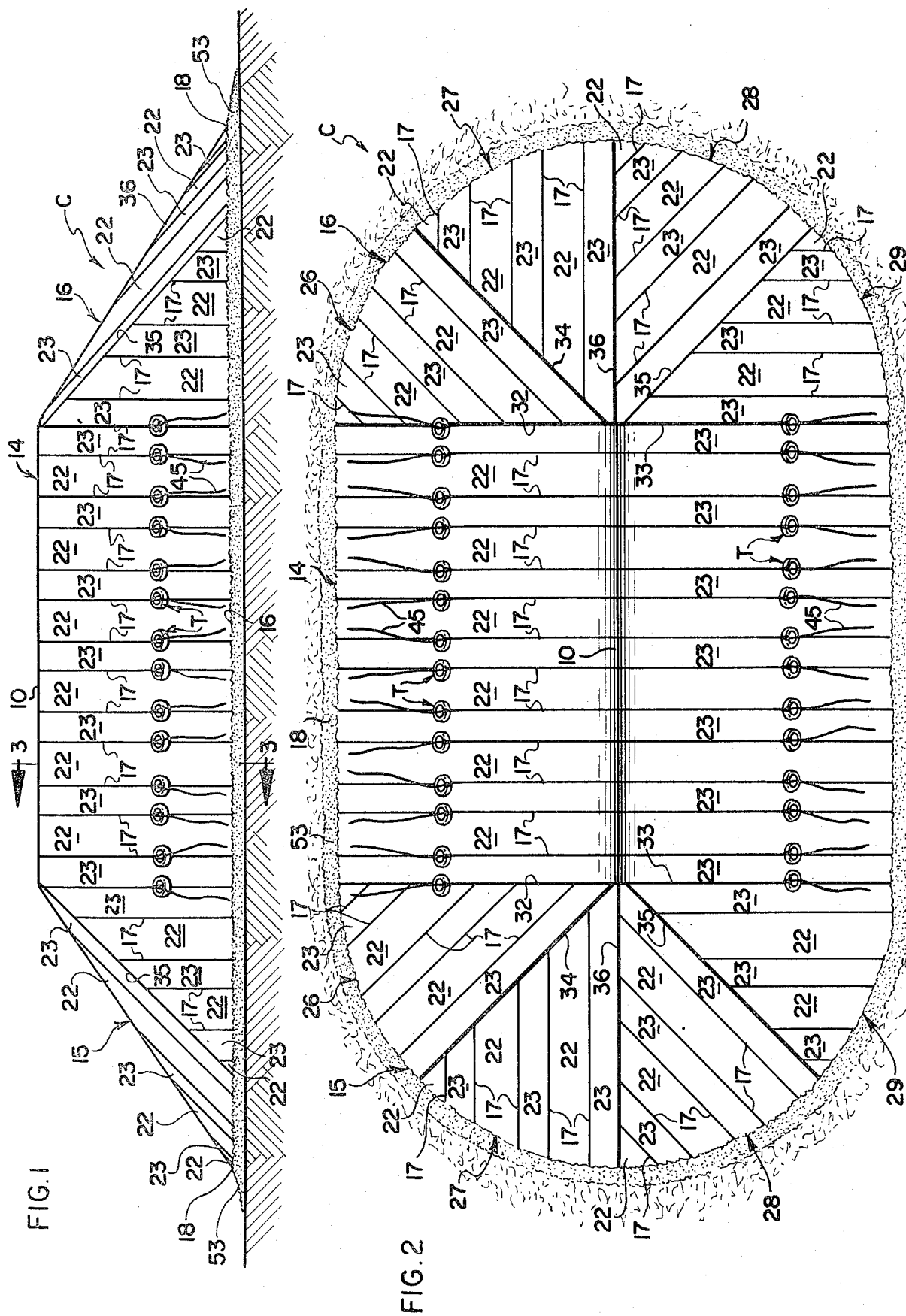
FIG. 1 is a side elevational view of a protective cover embodying the features of the present invention and showing the latter as it would appear when installed on a pile of flowable, particulate material, such as salt.
FIG. 2 is a top plan view of the protective cover shown in FIG. 1.
Figure 3:
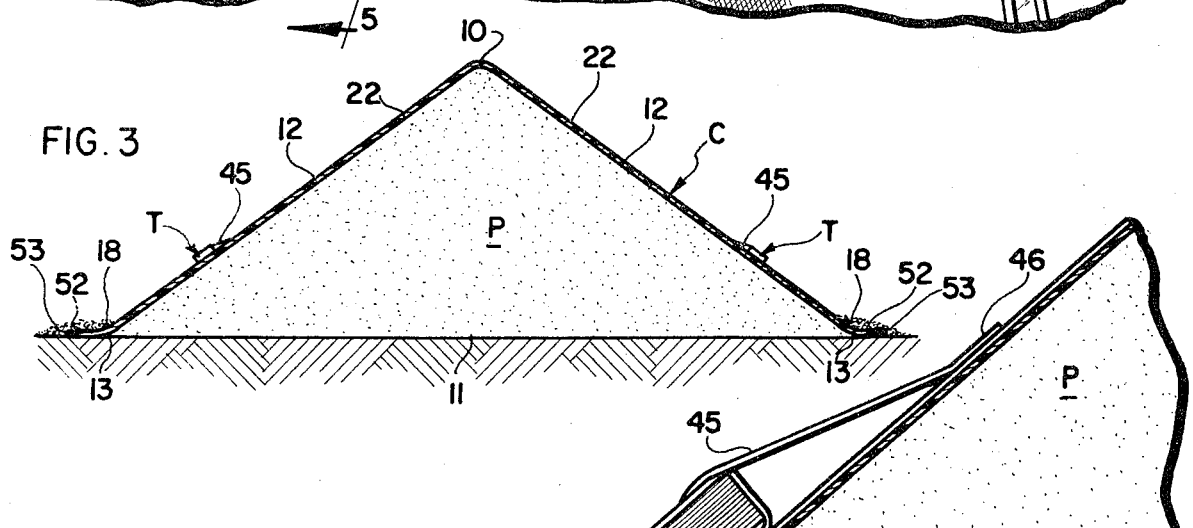
FIG. 3 is a vertical sectional view taken along the line 3—3 of FIG. 1.
Figure 5:
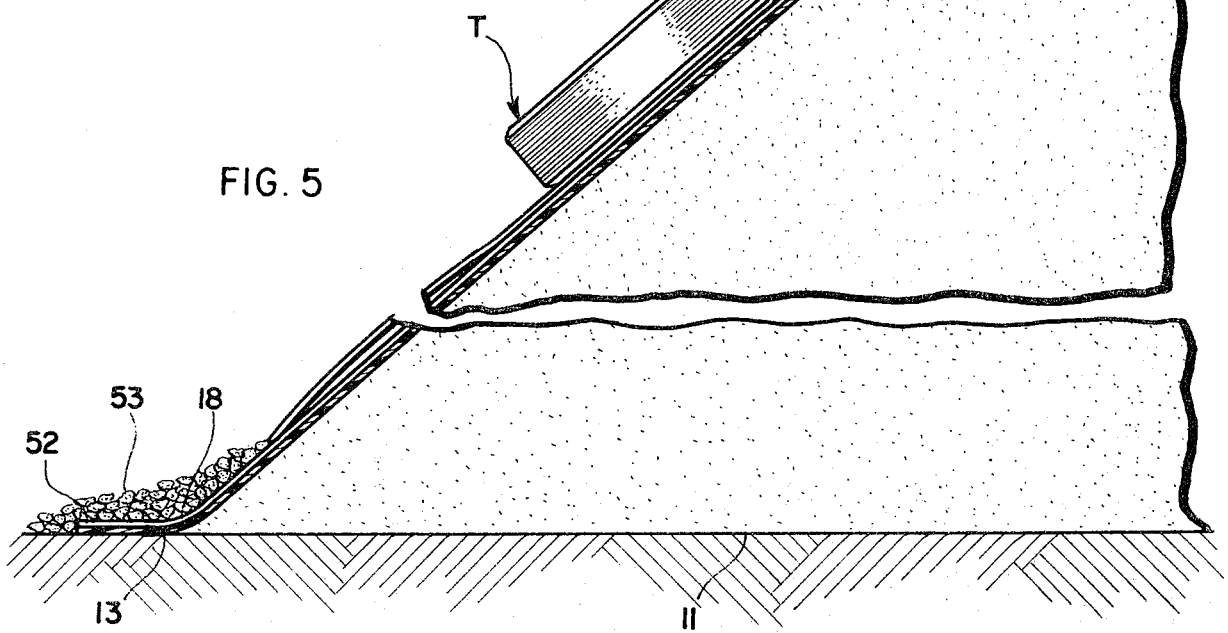
FIG. 5 is an enlarged, broken, fragmentary sectional view, taken substantially along the line 5—5 of FIG. 4.
Figure 8:
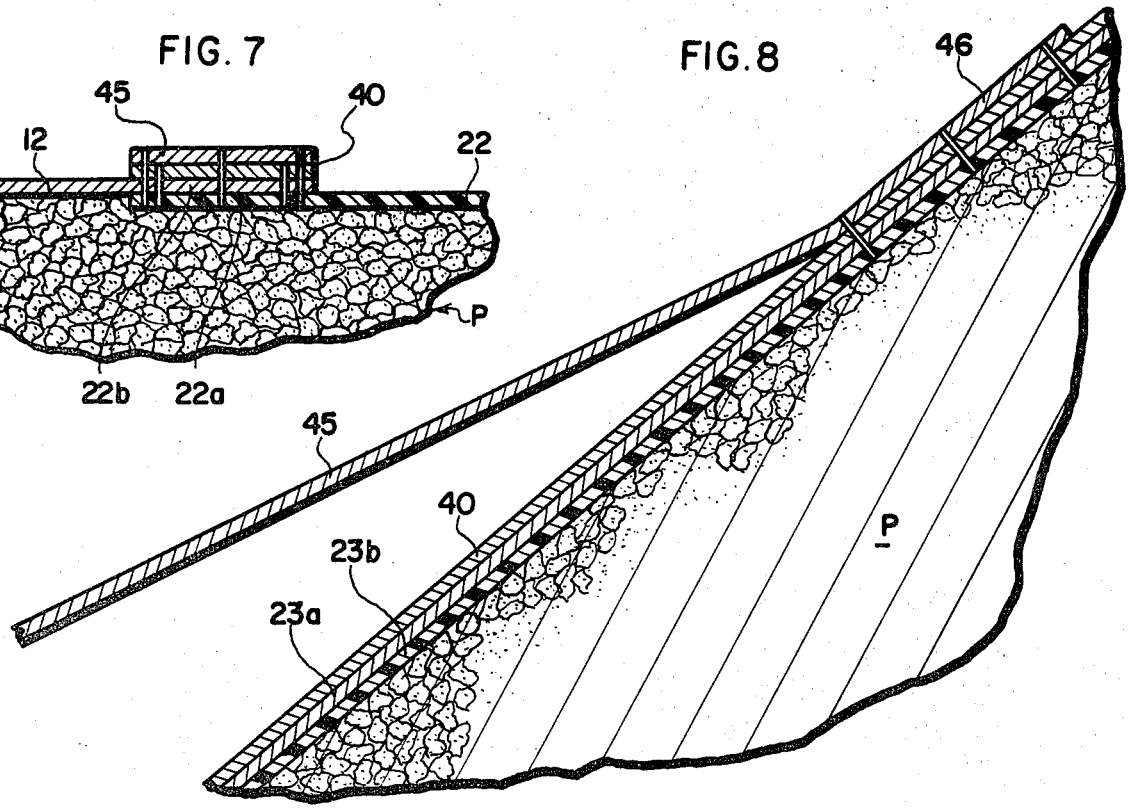
FIG. 8 is an enlarged, fragmentary sectional view taken substantially along the line 8—8 of FIG. 6.

In FIGS. 1 and 2, a protective cover embodying the features of the present invention is illustrated and indicated generally at C. The cover C, in the present instance, is shown as it would appear when operatively engaged with an elongated, pile or mound of flowable, particulate, material, indicated generally at P in FIGS. 3, 5 and 8, having an apex 10 and a base 11 (FIGS. 3 and 5) which is generally oval in plan. The sides, indicated at 12, of the pile P are generally flat and slope downwardly and outwardly from the elongated apex 10 toward the perimeter, indicated at 13 in FIGS. 3 and 5, of the base 11 at angles corresponding to the angle of repose of the material of the pile. The outer surfaces of the ends of the pile P likewise slope downwardly from the ends of the apex 10 toward the perimeter 13 in the manner of the outer surface of a vertically truncated cone.

Figure 4:
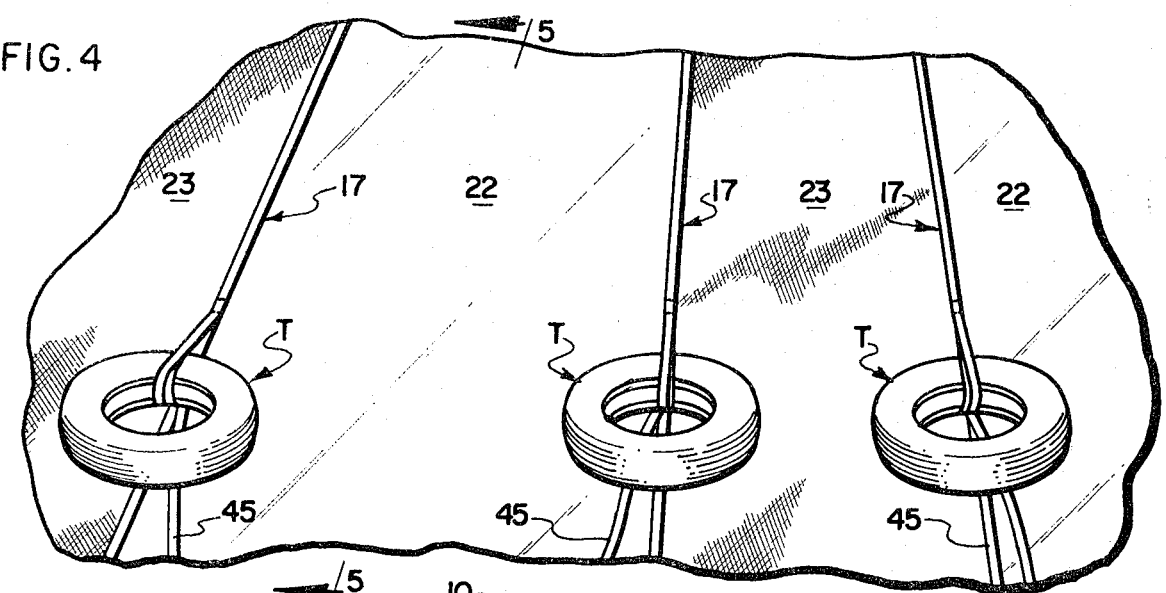
FIG. 4 is an enlarged, fragmentary perspective view of a portion of one side of the cover illustrated in FIGS. 1 and 2 and showing the manner in which retaining weights are secured to the cover in spaced relation from the lower margin thereof.

As est seen in FIGS. 1 and 2, the cover C includes a central portion 14 and left and right portions 15 and 16, respectively, as viewed in FIGS. 1 and 2, which rest on and assume the shapes of the sides 12 and ends of the pile P. According to the present invention, the central portion 14 and end portions 15 and 16 are formed by a plurality of elongated panels, which are arranged so as to extend lengthwise between the apex 10 and perimeter 13 of the pile P and so that the connecting seams, indicated at 17, along the ajoining side edges of the panels extend substantially perpendicularly to the margin, indicated at 18, around the lower end of the cover. As will be apparent from FIGS. 4 and 5, the margin 18 is substantially coextensive with the perimeter 13 (FIGS. 4 and 5) of the base 11.

The panels of the central portion 14 may be of the same material and the same width but are preferably of two different widths and materials. Thus, as illustrated in FIGS. 1 and 2, the central portion 14 of the cover includes a plurality of panels 22, which are of a material that is substantially nonporous to gas and liquid, such as polyethylene plastic, and a plurality of panels 23 which are porous to gas and substantially nonporous to liquids, such as canvas. The polyethylene panels 22 are preferably about 6 ft. wide and the canvas panels 23 are preferably about 4 ft. wide.

The left and right end portions 15 and 16 of the cover C are likewise provided by a plurality of the panels 22 and 23. However, in the left and right end portions, the panels are cut or otherwise formed into pie-shaped sections, indicated at 26, 27, 28 and 29, respectively. The panels in each of the pie-shaped sections 26-29 are preferably arranged in the same manner as the panels 22 and 23 of the central portion 14, i.e. they extend lengthwise between the apex 10 and perimeter 13 of the pile P and so that the seams 17 thereof extend generally perpendicularly to the margin 18 of the cover, as illustrated in FIG. 2. The pie-shaped sections 26 and 29 of the end portions 15 and 16 are connected to the longitudinally outermost panels of the central portion 14 along seams 32 and 33, respectively, and the pie-shaped sections 26 and 29 of the end portions 15 and 16 are connected to the sections 27 and 28 along seams 34 and 35, respectively. The sections 27 and 28 of the end portions 15 and 16 are likewise connected to each other along seams 36.

Figure 6:
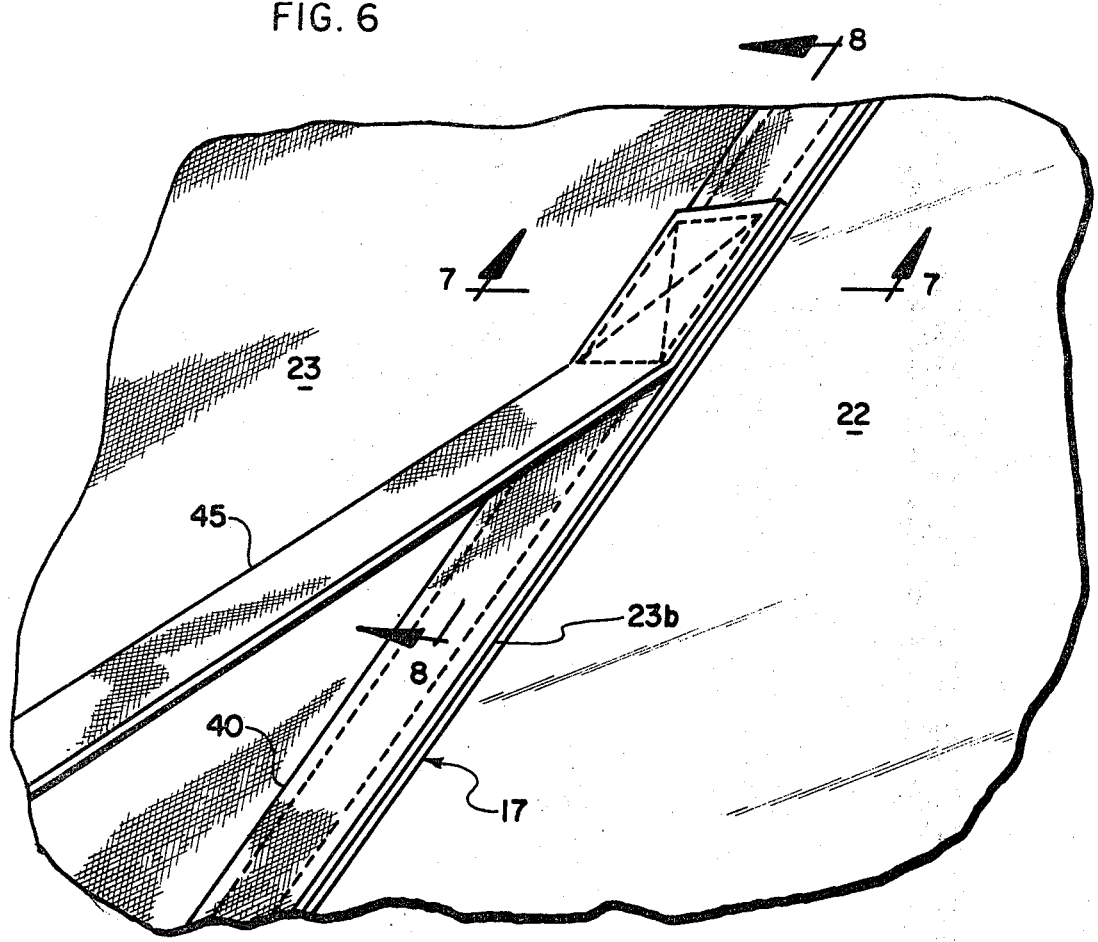
FIG. 6 is an enlarged, fragmentary perspective view of a portion of one of the seams of the cover at the junction of one of the supplemental, weight retaining straps with the reinforced seam.
Figure 7:
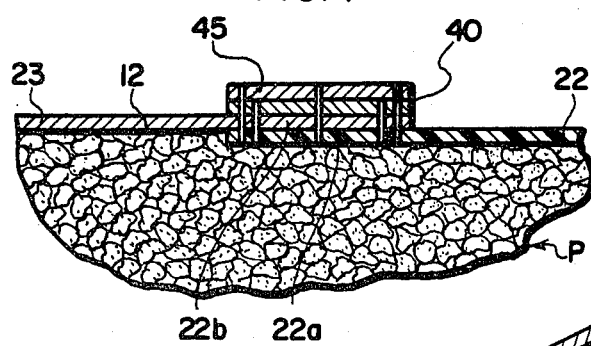
FIG. 7 is an enlarged, fragmentary sectional view taken substantially along the line 7—7 of FIG. 6.

As previously mentioned, the panels 22 and 23 of the central portion 14 and end portions 15 and 16 of the cover C are connected together along their side edges by the seams 17 and 32-36, inclusive. Such connection is preferably made by sewing the seams together at the site where the cover is to be installed. According to the present invention, each of the aforementioned seams is reinforced at the time the seams are formed, or afterwards, by sewing or otherwise securing strips of reinforcing material thereto, such as lengths of canvas strapping or webbing, indicated at 40 in FIGS. 6, 7 and 8. Before ajoinint edges, indicated at 22a and 23a, respectively, of the panels 22 and 23 are connected to each other, these edges are partially overlapped and sewn together, as illustrated in FIG. 7. Thereafter, the reinforcing strapping 40 is placed over the overlapped, sewn edges 22a and 23a and the strapping is then sewn thereto to form the seams 17 and 34-36, inclusive. Alternately, the overlapped edges 22a and 23a and overlying strapping 40 could be sewed together at the same time.

Thus, the provision of the reinforcing strapping or webbing 40 on each of the seams 17 and 32-36, inclusive, substantially increases the strength of the cover so that there is less likelihood that a person walking on the cover to inspect or repair the same will break through the cover and become engulfed in the underlying pile of material. The increased strength of the seams 17 and 32-36, inclusive also reduces the chances of breaks or tears developing in the cover when the latter is exposed to high winds, accumulated water and ice.

In order to minimize the possibility of separation of the cover from the underlying pile of material due to aerodynamic lift, the cover includes means for securing a plurality of weights thereto at spaced intervals on the upper surface of the cover. To this end, at least the central portion 14 of the cover includes weight engaging and retaining means in the form of a plurality of lengths of weight retaining strips of cloth webbing or tape, indicated at 45 in FIGS. 1, 2 and 4-8, inclusive. According to the present invention, one end, indicated at 46 of each strip 45 is secured, as by sewing, to the seams 17 of the central portion 14 of the cover at points spaced upwardly from the margin 18 of the cover by between about 10 to 20 ft. The unconnected portions of the strips 45 may be tied to or otherwise engaged with appropriate weights so that the latter are secured to the outer surface of the cover C to retain the latter engaged with the underlying pile of material being protected. While different types of weights can be used for this purpose, a plurality of automobile tires, some of which are indicated at T in FIGS. 1-5, inclusive, are well suited for this purpose. Automobile tires are preferred as weights since they normally do not have sharp projections or surfaces which might puncture or tear the cover C.

Thus, when the tires T are used as weights, the free ends of the retaining webbing 45 may be passed through the open centers of the tires, one or more times, and thereafter tied in a knot to secure the tires to the cover. Because of the increased strength and stiffness imparted to the cover C by the reinforcing webbing 40 in each of the seams 17 and 32-36, inclusive, only one row of the tires T is usually needed on each of the flat sides 12 of the pile P to counteract the effects of aerodynamic lift.

The remote free ends of the retaining strips 45 may be secured to anchors (not shown) driven into the ground at points spaced outwardly from the margin 18 of the cover and in general alignment with the seams 17 and 32-36, inclusive.

The increased strength of the cover C resulting from the reinforced seams 17 and 32-36, inclusive, and the direction in which the seams extend in the cover, is also advantageous in that this construction eliminates the need for additional rows of tires T near the top and bottom of the cover and their connecting cables or ropes.

In order to prevent the margin 18 of the cover C from being displaced by the wind and folded back upon itself so that the material of the pile P is exposed, the cover C is provided with a shirt 52 (FIGS. 3 and 5), which extends outwardly from the margin 18 and perimeter 13 of the pile P. The skirt 52 may be either formed integrally with the cover C, as an extension of the margin 18, or separately from the cover and joined thereto at the margin 18 by any suitable means, such as sewing. Ballast material, such as a layer of pebbles or crushed rock, indicated at 53, is applied to the skirt 52, in the manner illustrated in FIGS. 1, 2, 3 and 5, to provide the aforementioned additional resistance of the margin 18 of the cover to unintended displacement as a result of high winds and/or gusts.

In certain installations, the layer of ballast material on the skirt 52 may be sufficient to counteract the effects of aerodynamic lift. In such installations, it is unnecessary to secure automobile tires to the upper surface of the cover C by means of the retaning strips 45.

It should be understood that a plurality of the weight retaining strips or webbing 45 could be connected to the seams 17 and 32–36, inclusive, of the pie-shaped sections 26–29, inclusive, of the cover, if desired, in order to counteract effects of aerodynamic lift on the end portions 15 and 16.

It should also be understood that, while the protective cover C of the present invention has been herein described in conjunction with a pile of flowable, particulate material, such as salt, having inclined sides, the cover could also be used to advantage to protect other large objects in outside storage which do not have inclined sides and which are not composed of flowable, particulate material.

While one or more embodiments of the invention have been herein illustrated and described, it will be understood that modifications and variations thereof may be developed which do not depart from the spirit of the invention and the scope of the appended claims.

What is claimed is:

1. A protective cover for a pile of particulate material having an apex and a base and sides sloping downwardly and outwardly from said apex toward the perimeter of said base, said cover comprising a plurality of elongated panels adapted to overlie said pile and extend lengthwise between the apex and perimeter of said base, the laterally spaced, side edges of said panels being joined together by seams that are adapted to extend substantially perpendicularly to the perimeter of said base, and some of said panels being porous to gas and substantially nonporous to liquid and other of said panels being substantially nonporous to both gas and liquid.

2. The cover of claim 1, in which said gas porous and substantially liquid nonporous panels are of canvas.

3. The cover of claim 1, in which said gas and liquid nonporous panels are of plastic.

4. The cover of laim 3, in which said plastic comprises polyethylene.

5. The cover of claims 1, 2, 3 or 4, in which said gas-porous and liquid-nonporous panels and said gas and liquid nonporous panels are arranged in alternating relation.

6. The cover of claim 5, in which said gas-porous and liquid-nonporous panels are about 4 ft. wide and said gas and liquid-nonporous panels are about 6 ft. wide.

7. The cover of claim 1, in which a plurality of strips of reinforcing material are respectively secured to said seams so as to be a part thereof, said reinforced seams serving to strengthen said cover and improve the resistance thereof to separation and tearing when said cover is in use.

8. The cover of claim 7, in which said strips of seam reinforcing material comprise lengths of canvas strapping.

9. The cover of claim 8, in which the adjoining side edges of said panels overlap each other, and said lengths of canvas strapping overlie said overlapped edges.

10. The cover of claim 9, in which said overlapped side edges of said panels and said overlying lengths of canvas strapping are secured together by sewing.

11. The cover of claim 1, which includes a central portion and adjacent end portions, each of said end portions including a plurality of substantially pie-shaped sections having a plurality of said elongated panels, and the seams in each of said pie-shaped sections are adapted to extend substantially perpendicularly to the perimeter of said base at said end portions.

12. The cover of claim 7, in which the ends of a plurality of lengths of weight retaining strips are respectively connected to at least some of the seams of said cover at points spaced upwardly from the perimeter of said pile, the free ends of said retaining strips respectively being adapted to engage and retain a plurality of weights on said cover.

13. The cover of claim 12, in which said cover has a margin and is sized so that said margin is substantially coextensive with the perimeter of said pile, and the ends of said retaining strips are secured to said seams at points spaced upwardly from said margin by between about 10 to 20 feet.

14. The cover of claim 1, in which said cover has a margin that is substantially coextensive with the perimeter of said pile, a skirt extends outwardly beyond said margin and the perimeter of said pile, and said skirt is adapted to receive ballast which prevents the margin of said cover from being displaced by wind gusts.

* * * * *

UNITED STATES PATENT AND TRADEMARK OFFICE
CERTIFICATE OF CORRECTION

PATENT NO. : 4,413,029
DATED : November 1, 1983
INVENTOR(S) : Gary R. Handwerker It is certified that error appears in the above—identified patent and that said Letters Patent are hereby corrected as shown below:

Column 3, line 1, change "est" to --best--; line 10, change "ajoining" to --adjoining--; line 12, change "end" to --edge--; line 57, change "ajoinint" to --adjoining--; Column 4, line 57, change "shirt" to --skirt--; Column 5, line 44, change "laim" to --claim--.

Signed and Sealed this

Sixth Day of March 1984

[SEAL]

Attest:

GERALD J. MOSSINGHOFF

Attesting Officer

Commissioner of Patents and Trademarks